United States Patent
Erickson et al.

(10) Patent No.: US 11,396,129 B2
(45) Date of Patent: Jul. 26, 2022

(54) INCREASING ELECTRICAL CONDUCTIVITY AT SELECTED LOCATIONS OF A 3D OBJECT

(71) Applicant: HEWLETT-PACKARD DEVELOPMENT COMPANY, L.P., Houston, TX (US)

(72) Inventors: Kristopher J. Erickson, Palo Alto, CA (US); Thomas C. Anthony, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 950 days.

(21) Appl. No.: 16/076,514

(22) PCT Filed: Apr. 18, 2017

(86) PCT No.: PCT/US2017/028098
§ 371 (c)(1),
(2) Date: Aug. 8, 2018

(87) PCT Pub. No.: WO2018/194564
PCT Pub. Date: Oct. 25, 2018

(65) Prior Publication Data
US 2021/0178686 A1  Jun. 17, 2021

(51) Int. Cl.
*B29C 64/165* (2017.01)
*C25D 5/56* (2006.01)
(Continued)

(52) U.S. Cl.
CPC ............ *B29C 64/165* (2017.08); *B29C 64/30* (2017.08); *B29C 64/393* (2017.08);
(Continued)

(58) Field of Classification Search
CPC ............................ B29C 64/153; B29C 64/165
See application file for complete search history.

(56) References Cited

U.S. PATENT DOCUMENTS

| 6,363,606 B1 | 4/2002 | Johnson et al. |
| 7,524,528 B2 * | 4/2009 | Kodas ............... C09D 11/30 427/101 |

(Continued)

FOREIGN PATENT DOCUMENTS

| CN | 102409319 A * | 4/2012 |
| CN | 103692654 A | 4/2014 |

(Continued)

OTHER PUBLICATIONS

"Colour 3D Printing and Finishing", Retrieved from Internet—https://3d-printing-engineering.com/easyblog/entry/colour-3d-printing-upcoming-events. May 7, 2015, 3 Pages.
(Continued)

*Primary Examiner* — Atul P. Khare
(74) *Attorney, Agent, or Firm* — HPI Patent Department

(57) ABSTRACT

A device includes a coater, a dispenser, and a treatment portion. The coater is to coat, layer-by-layer, a build material relative to a build pad to form a 3D object. The dispenser is to at least dispense a fluid including a first at least potentially electrically conductive material. In at least some selected locations of an external surface of the 3D object. The treatment portion is to treat the 3D object to substantially increase electrically conductivity on the external surface of the 3D object at the at least some selected locations.

15 Claims, 8 Drawing Sheets

(51) Int. Cl.
*B33Y 10/00* (2015.01)
*B33Y 30/00* (2015.01)
*B33Y 50/02* (2015.01)
*B29C 64/393* (2017.01)
*B29C 64/30* (2017.01)
*B33Y 40/20* (2020.01)
*B29C 71/00* (2006.01)
*B29C 71/02* (2006.01)
*C23C 18/16* (2006.01)
*B33Y 80/00* (2015.01)
*B33Y 99/00* (2015.01)

(52) U.S. Cl.
CPC .......... *B29C 71/0009* (2013.01); *B29C 71/02* (2013.01); *B33Y 10/00* (2014.12); *B33Y 30/00* (2014.12); *B33Y 40/20* (2020.01); *B33Y 50/02* (2014.12); *C23C 18/1603* (2013.01); *C25D 5/56* (2013.01); *B29C 2071/022* (2013.01); *B33Y 99/00* (2014.12)

(56) References Cited

U.S. PATENT DOCUMENTS

| | | | | |
|---|---|---|---|---|
| 7,658,831 | B2* | 2/2010 | Mathieu | C23C 18/1608 205/136 |
| 8,968,625 | B2* | 3/2015 | Tan | B29C 64/141 264/439 |
| 9,114,567 | B2* | 8/2015 | Monsheimer | B29C 64/153 |
| 9,533,451 | B2* | 1/2017 | Folgar | B33Y 80/00 |
| 9,545,669 | B2* | 1/2017 | Aklint | H05K 1/0274 |
| 9,550,207 | B2* | 1/2017 | Ackelid | B28B 1/001 |
| 9,875,958 | B1* | 1/2018 | Buvid | H01L 21/486 |
| 9,993,982 | B2* | 6/2018 | Sherrer | H05K 1/0284 |
| 10,049,318 | B2* | 8/2018 | Kling | B32B 27/08 |
| 10,259,160 | B2* | 4/2019 | Mark | B29C 64/209 |
| 10,294,567 | B2* | 5/2019 | Ma | C09D 11/322 |
| 10,375,765 | B2* | 8/2019 | Chaffins | H05K 3/12 |
| 10,375,834 | B1* | 8/2019 | Liu | H05K 1/181 |
| 10,396,469 | B1* | 8/2019 | Fritz | H05K 3/143 |
| 10,449,730 | B2* | 10/2019 | Kodama | B29C 64/153 |
| 10,647,057 | B2* | 5/2020 | Therriault | C09D 7/61 |
| 10,926,464 | B2* | 2/2021 | Chaffins | B22F 10/00 |
| 10,974,496 | B2* | 4/2021 | Wright | B33Y 30/00 |
| 11,001,000 | B2* | 5/2021 | Chaffins | B28B 1/001 |
| 11,001,050 | B2* | 5/2021 | Chaffins | B33Y 30/00 |
| 11,064,572 | B2* | 7/2021 | Chaffins | B29C 64/165 |
| 2006/0118990 | A1* | 6/2006 | Dierkes | A61C 13/0022 264/104 |
| 2009/0004381 | A1* | 1/2009 | Fujisawa | B29C 64/165 427/203 |
| 2009/0162621 | A1 | 6/2009 | Craamer et al. | |
| 2012/0065755 | A1 | 3/2012 | Steingart et al. | |
| 2014/0252685 | A1* | 9/2014 | Stucker | B29C 64/268 264/401 |
| 2014/0255666 | A1* | 9/2014 | Stucker | B29C 64/153 428/201 |
| 2014/0314964 | A1 | 10/2014 | Ackelid | |
| 2015/0190965 | A1 | 7/2015 | Okamoto | |
| 2015/0201500 | A1* | 7/2015 | Shinar | B29C 64/135 425/132 |
| 2016/0068696 | A1 | 3/2016 | Xu | |
| 2017/0015065 | A1* | 1/2017 | Potter | B29C 70/882 |
| 2017/0080495 | A1 | 3/2017 | Ackelid | |
| 2018/0071980 | A1* | 3/2018 | Lomasney | C25D 5/617 |
| 2018/0272601 | A1* | 9/2018 | Erickson | B33Y 50/02 |
| 2019/0009464 | A1* | 1/2019 | Steege | B33Y 10/00 |
| 2019/0010348 | A1* | 1/2019 | Chaffins | C09D 11/037 |
| 2019/0134898 | A1* | 5/2019 | Zhao | B29C 64/112 |
| 2021/0071020 | A1* | 3/2021 | Hu | B33Y 40/20 |
| 2021/0170678 | A1* | 6/2021 | Chaffins | B29C 64/336 |
| 2021/0229350 | A1* | 7/2021 | Chaffins | C23C 18/1608 |
| 2021/0283837 | A1* | 9/2021 | Wei | B29C 64/118 |
| 2021/0284830 | A1* | 9/2021 | Doris | C08L 23/0853 |

FOREIGN PATENT DOCUMENTS

| | | |
|---|---|---|
| CN | 105365223 A | 3/2016 |
| CN | 105563841 A | 5/2016 |
| CN | 106493939 A | 3/2017 |
| WO | WO-0226420 | 4/2002 |
| WO | 2005057979 A1 | 6/2005 |
| WO | 2014118783 A1 | 8/2014 |
| WO | WO-2014200595 | 12/2014 |
| WO | WO-2015136277 A1 | 9/2015 |
| WO | 2016053312 A1 | 4/2016 |
| WO | 16104898 A1 | 6/2016 |
| WO | 2016146374 A1 | 9/2016 |
| WO | WO-2016151586 | 9/2016 |

OTHER PUBLICATIONS

"Silver Printing Inks For Offset Printing", Huber Group, Retrieved from internet—http://www.druckfarben.gr/en/inks/SILVER%20Offset%20Inks.pdf, 2003, 2 Pages.

\* cited by examiner

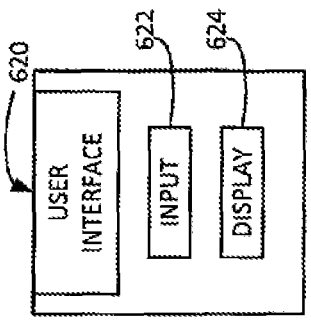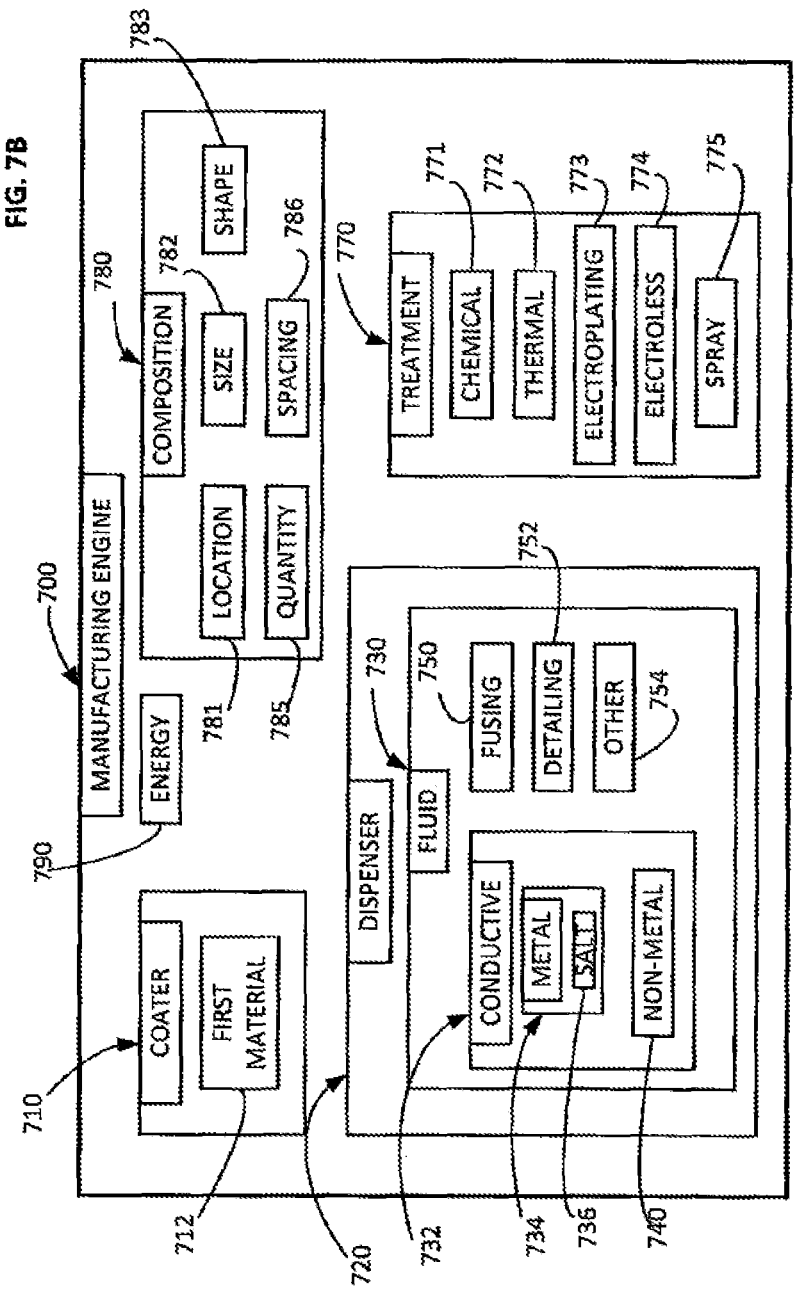

INCREASING ELECTRICAL CONDUCTIVITY AT SELECTED LOCATIONS OF A 3D OBJECT

BACKGROUND

Additive manufacturing may revolutionize design and manufacturing in producing three-dimensional (3D) objects. Some forms of additive manufacturing may sometimes be referred to as 3D printing. Some additively manufactured 3D objects may have functional characteristics, such as mechanical or electrical utility, while other 3D objects may simply be made for aesthetic purposes.

BRIEF DESCRIPTION OF THE DRAWINGS

FIGS. 1-2A are each a diagram schematically representing an example device to additively manufacture a 3D object, including an example treatment portion.

FIG. 2B is a block diagram schematically representing an example 3D object including an internal electrically conductive structure.

FIG. 7A is a block diagram schematically representing an example control portion.

FIG. 7B is a block diagram schematically representing an example user interface.

FIG. 8 is a block diagram schematically representing an example manufacturing engine.

DETAILED DESCRIPTION

Figure 1:
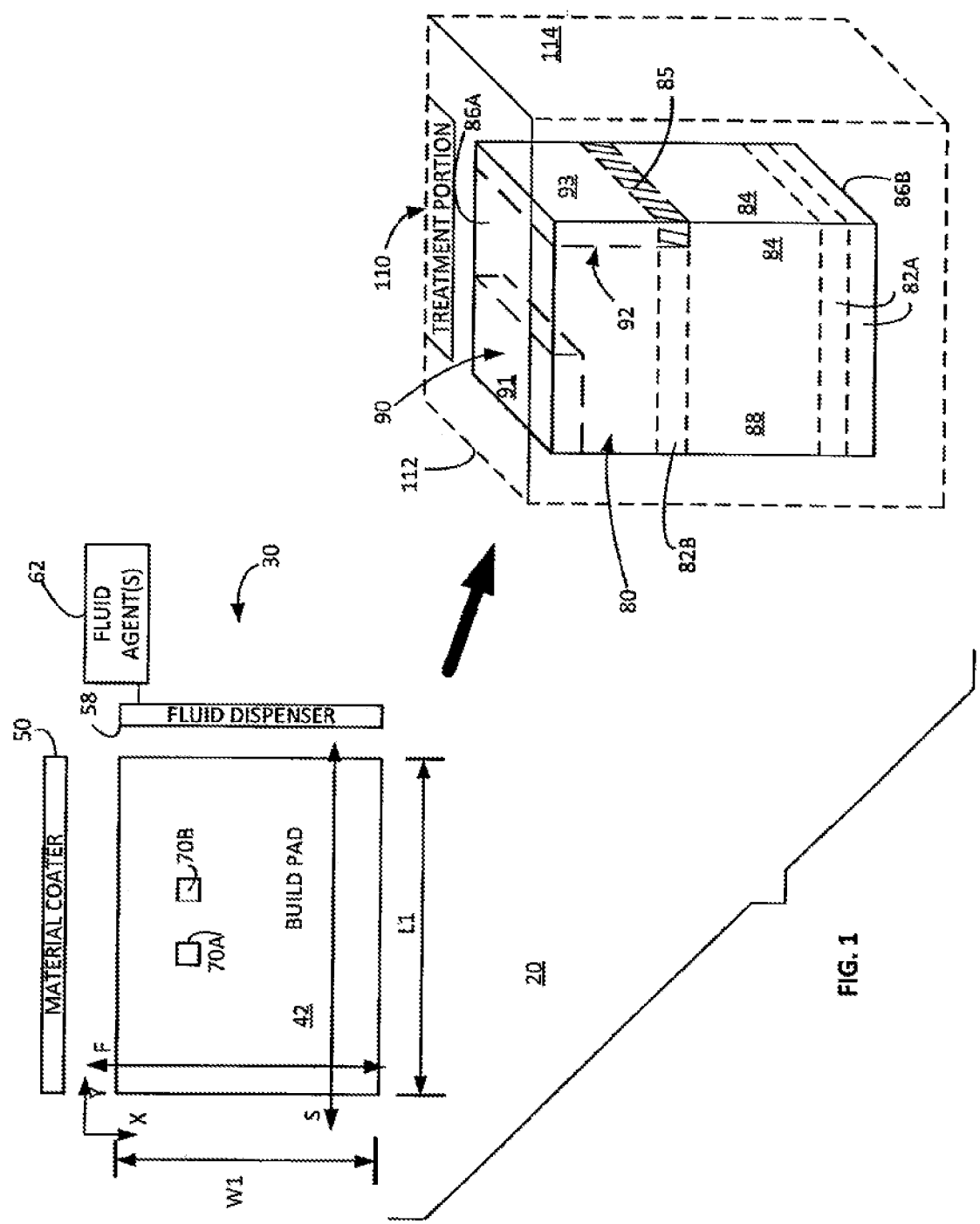
Figure 2:
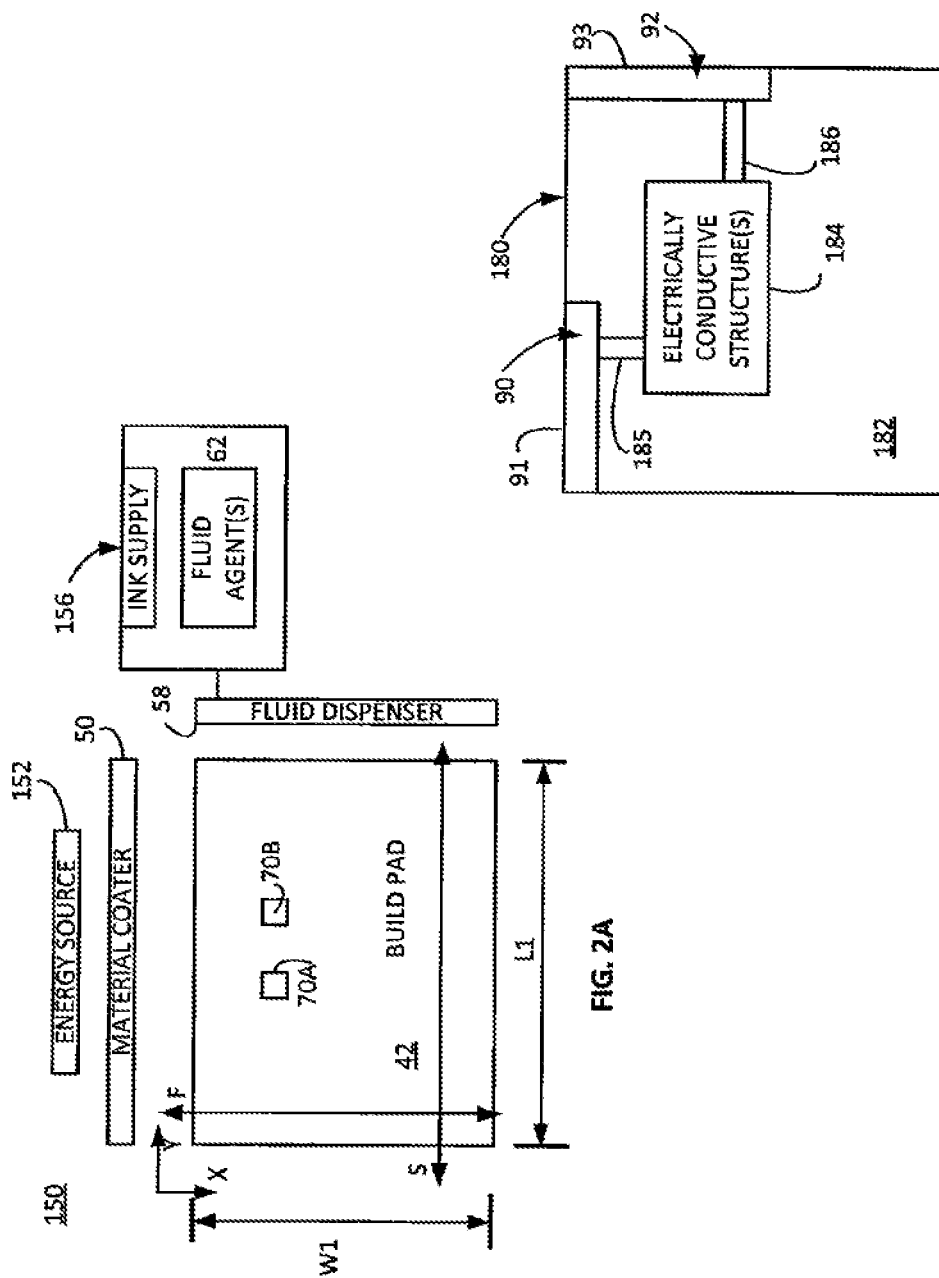

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure involve additively manufacturing a 3D object including treating the 3D object to increase a conductivity of at least a portion of the 3D object.

In some examples, a device for additively manufacturing a 3D object comprises a coater, a dispenser, and a treatment portion. The coater is to coat, layer-by-layer, a build material on a build pad to form a 3D object. The dispenser is to dispense at least a fluid including a first at least potentially electrically conductive material in at least some selected locations of an external surface of the 3D object. The treatment portion is to treat the 3D object to increase electrically conductivity on the external surface of the 3D object at the at least some selected locations.

In some examples, the first at least potentially electrically conductive material comprises a material which is already electrically conductive or a material which has the potential to become electrically conductive during or after dispensing, as described later in more detail.

In some examples, the device comprises an energy source. In some examples, the energy source may induce fusing of selectable regions of the respective layers after each layer is coated relative to the build pad. In some such examples, prior to the energy source applying energy to induce fusing, the dispenser may also dispense at least a fusing agent in selectable regions of at least some of the respective layers.

In some examples, the same energy source or a different energy source may be involved in treating the 3D object to increase the electrical conductivity at the at least some selected locations of the external surface of the 3D object. Moreover, in some examples, the dispenser also may dispense a fusing agent on the remaining locations of external surface of the 3D object, i.e. locations other than the at least some selected locations on the external surface. Via such an arrangement, locations on the external surface of the 3D object, which do not receive the first at least potentially electrically conductive material, may be fused.

In some examples, the treatment portion comprises an environment to apply a chemical treatment or a thermal treatment to the at least some selected locations of the external surface of the 3D object. In some examples, the treatment portion comprises an environment to cause electroplating, electroless plating, or spraying with a second electrically conductive material at the at least some selected locations on the 3D object.

In some examples, via the deposition of the first at least potentially electrically conductive material at the some selected locations, precise and accurate control may be exerted over the later placement of the second electrically conductive material at the at least some selected locations.

Via at least some of these examples, an electrical conductivity is substantially increased at the at least some selected locations of an external surface of an additively manufactured 3D object. Such locations may serve as bonding pads for other external conductive elements and/or conductive elements within the 3D object, such as an electronic via. In some examples, this increased conductivity may enhance an appearance of the 3D object without otherwise generally dictating or affecting the selectable color, optical, surface properties, etc. of the additively manufactured 3D object.

In some examples, the selectivity may be implemented via an additive process during additive manufacturing of the 3D object, in which the first at least potentially electrically conductive material is infused into any selectable voxel location on the external surface of the 3D object. In some examples, the selective increase of conductivity may be confidently achieved via the treatment portion regardless of the particular topology of the external surface of the 3D object because the respective example treatment portions do not rely on a direct line of sight to each surface of the various topological features of the 3D object. As such, in some examples of the present disclosure, the increased electrical conductivity on the external surface of the 3D object may be contiguous despite discontinuities and/or changes in orientation, angle, etc. of the external surface of the 3D object.

Moreover, in some examples, the selectivity in increasing the electrical conductivity may be implemented without the use of masks.

In some examples, different second electrically conductive materials may be added via a treatment portion to different selected locations, thereby enabling differentiation in the type of metallic finish and/or degree of electrical conductivity and/or magnetic properties at a particular selected location.

These examples, and additional examples, are described and illustrated in association with at least FIGS. 1-9.

FIG. 1 is a diagram schematically representing an example device 20. As shown in FIG. 1, in some examples, the device 20 comprises a manufacturing portion 30 to additively manufacture an example 3D object and a treatment portion 110. In some examples, the manufacturing portion 30 comprises a material coater 50 and a fluid dispenser 58. The manufacturing portion 30 may sometimes be referred to as a build environment.

The material coater 50 is arranged to coat a build material layer-by-layer onto a build pad 42 to additively form a 3D object 80 shown in FIG. 1. Once formed, the 3D object may be separated from the build pad 42. It will be understood that a 3D object of any shape can be manufactured, and the object 80 depicted in FIG. 1 provides just one example shape of a 3D object. In some instances manufacturing portion 30 may sometimes be referred to as a 3D printer. Accordingly, the build pad 42 may sometimes be referred to as a print bed or a receiving surface.

It will be understood that the coater 50 may be implemented via a variety of electromechanical or mechanical mechanisms, such as doctor blades, slot dies, and/or other structures suitable to spread and/or otherwise form a coating of the build material in a generally uniform layer relative to the build pad 42 or relative to a previously deposited layer of build material.

In some examples, the material coater 50 has a length (L1) at least generally matching an entire length (L1) of the build pad 42, such that the material coater 50 is capable of coating the entire build pad 42 with a layer 82A of build material in a single pass as the material coater 50 travels the width (W1) of the build pad 42. In some examples, the material coater 50 can selectively deposit layers of material in lengths and patterns less than a full length of the material coater 50. In some examples, the material coater 50 may coat the build pad 42 with a layer 82A of build material(s) using multiple passes instead of a single pass.

It will be further understood that a 3D object additively formed via manufacturing portion 30 may have a width and/or a length less than a width (W1) and/or length (L1) of the build pad 42.

In some examples, the material coater 50 moves in a first orientation (represented by directional arrow F) while the fluid dispenser 58 moves in a second orientation (represented by directional arrow S) generally perpendicular to the first orientation. In some examples, the material coater 50 can deposit material in each pass of a back-and-forth travel path along the first orientation while the fluid dispenser 58 can deposit fluid agents in each pass of a back-and-forth travel path along the second orientation. In at least some examples, one pass is completed by the material coater 50, followed by a pass of the fluid dispenser 58 before a second pass of the material coater 50 is initiated, and so on.

In some examples, the material coater 50 and the dispenser 58 can be arranged to move in the same orientation, either the first orientation (F) or the second orientation (S). In some such examples, the material coater 50 and the dispenser 58 may be supported and moved via a single carriage while in some such examples, the material coater 50 and dispenser 58 may be supported and moved via separate, independent carriages.

In some examples, the build material used to generally form the 3D object comprises a polymer material. In some examples, the polymer material comprises a polyamide material. However, a broad range of polymer materials may be employed as the build material. In some examples, the build material may comprise a ceramic material. In some examples, the build material may take the form of a powder while in some examples, the build material may take a non-powder form. Regardless of the particular form, the build material is suitable for spreading, depositing, etc. in a flowable form to produce a coating (via coater 50) relative to build pad 42 and/or relative to previously coated first layers of the build material. In at least some examples, the build material comprises a generally electrically non-conductive material.

In some examples, the build material does not significantly exhibit electrical properties, optical properties, magnetic properties, etc. However, if desired, at least some of these various properties may be infused into the build material to at least some degree via fluid agent(s) 62, as later described below in more detail in association with at least FIG. 1, 2A, and FIG. 8. Moreover, in some examples, a build material may already incorporate at least some of these properties prior employing the build material in forming the 3D object.

In some examples, the fluid dispenser 58 shown in FIG. 1 comprises a printing mechanism, which comprises an array of printheads, each including a plurality of individually addressable nozzles for selectively ejecting fluid agents onto a layer of build material. Accordingly, in some examples, the fluid dispenser 58 may sometimes be referred to as an addressable fluid ejection array. In some examples, the fluid dispenser 58 may eject individual droplets having a volume on the order of ones of picoliters or on the order of ones of nanoliters.

In some examples, fluid dispenser 58 comprises a thermal inkjet (TIJ) array. In some examples, fluid dispenser 58 may comprise a piezoelectric inkjet (PIJ) array or other technologies such as aerosol jetting, anyone of which can precisely, selectively deposit a small volume of fluid. In some examples, fluid dispenser 58 may comprise continuous inkjet technology.

In some examples, the fluid dispenser 58 selective dispenses droplets on a voxel-by-voxel basis. In one sense a voxel may be understood as a unit of volume in a three-dimensional space. In some examples, a resolution of 1200 voxels per inch in the x-y plane is implemented via fluid dispenser 58. In some examples, a voxel may have a height (or thickness) of about 100 microns, although a height of the voxel may fall between about 80 microns and about 100 microns. However, in some examples, a height of a voxel may fall outside the range of about 80 to about 100 microns.

In some examples, the fluid dispenser 58 has a width (W1) at least generally matching an entire width (W1) of the build pad 42, and therefore may sometimes be referred to as providing page-wide manufacturing (e.g. page wide printing). In such examples, via this arrangement the fluid dispenser 58 can deposit fluid agents onto the entire receiving surface in a single pass as the fluid dispenser 58 travels the length (L1) of the build pad 42. In some examples, the fluid dispenser 58 may deposit fluid agents onto a given layer of material using multiple passes instead of a single pass.

In some examples, fluid dispenser 58 may comprise, or be in fluid communication with, an array of reservoirs to contain various fluid agents 82. In some examples, the array of reservoirs may comprise an ink supply 156, as shown in FIG. 2A. In some examples, at least some of the fluid agents 62 may comprise a fusing agent, detailing agent, etc. to enhance formation of each layer 82A of build material. In particular, upon application onto the build material at selectable positions via the dispenser 58, the respective fusing agent and/or detailing agent may diffuse, saturate, and/or blend into the respective layer of the build material at the selectable positions.

After forming a desired number of layers 82A of the build material, in some examples the dispenser 58 may selectively dispense droplets of fluid agent(s) 62 at some selected locations 70A, 70B of an external surface 88 of the 3D object. It will be understood that a group of selectable locations 70A, 70B, or multiple different groups of selectable locations 70A, 70B, may be selected in any position, any size, any shape, and/or combination of shapes.

In some examples, the at least some selectable locations may comprise selectable locations corresponding to an entire external surface of a 3D object or an entire component of a multi-component 3D object. In some examples, the at least some selected locations correspond to an entire region (e.g. face, side, bottom, etc.) of a 3D object.

In some examples, the dispenser 58 dispenses the fluid agent(s) of an at least potentially electrically conductive material on a voxel-by-voxel basis to enable precise and accurate targeting of the at least potentially electrically conductive material to the at least some selected locations on the external surface of the 3D object at which the electrical conductivity may be increased later via a treatment portion, as described further below.

In some examples, the at least potentially electrically conductive material comprises a material which is already electrically conductive or a material which has the potential to become electrically conductive during or after dispensing, as described later in more detail.

With reference to FIG. 1, it will be understood that in some examples, each first selected location 80A, 80B in FIG. 1 may correspond to a group of single voxels while in some examples, each first selected location 80A, 80B may correspond to a single voxel.

In some examples, the treatment portion (e.g. 110 in FIG. 1) may be housed separate from, and independent of, the manufacturing portion 30. However, in some examples, the entire treatment portion 110 or a portion of the treatment portion 110 may be housed with and/or comprise a portion of the manufacturing portion 30.

As further shown in the diagram 200 of FIG. 2A, in some examples the manufacturing portion 30 includes an energy source 150 for irradiating the deposited build materials, fluid agents (e.g. fusing agent), etc. to cause heating of the material, which in turn results in the fusing of particles of the material relative to each other, with such fusing occurring via melting, sintering, etc. After such fusing, a layer 82A of build material is completely formed and additional layers 82A of build material may be formed in a similar manner as represented in FIG. 1.

In some examples, the energy source 150 may comprise a gas discharge illuminant, such as but not limited to a Halogen lamp. In some examples, the energy source 55 may comprise multiple energy sources.

As previously noted, energy source 150 may be stationary or mobile and may operate in a single flash or multiple flash mode.

In some examples, the energy source 150 comprises a single energy source. However, in some examples, the energy source 150 comprises a first energy source for fusing the various layers 82A of build material and a second energy source for facilitating treatment of the at least some selected locations of the external surface 88 of 3D object 80 to increase electrical conductivity. The second energy source may be located separately from the first energy source, such as being located within or near the treatment portion 110 (FIG. 1).

In some examples the manufacturing portion 30 can be used to additively form a 3D object via a MultiJet Fusion (MJF) process (available from HP, Inc.). In some examples, an additive manufacturing process performed via manufacturing portion 30 may omit at least some aspects of and/or may include at least some aspects of: selective laser sintering (SLS); selective laser melting (SLM); 3D binder printing (e.g. 3D binder jetting); fused deposition modeling (FDM); stereolithography (SLA); or curable liquid photopolymer jetting (Polyjet).

With these general components of manufacturing portion 30 in mind, one example formation of an example 3D object 80 is described.

As shown in FIG. 1, manufacturing portion 30 manufactures 3D object 80 by forming a selectable number of layers 82A of a build material. This formation includes using material coater 50 to coat the build pad 42 (or a preceding layer 82A) with a layer 82A of the build material and then applying a fluid agent 62 (e.g. at least a fusing agent) via dispenser 58 at selectable portions on the current layer 82A. Irradiation of these selectable portions by the energy source 150 (FIG. 2A) results in fusing of the build material, fusing agents, detailing agents, etc. This cycle of coating, dispensing and fusing is repeated until a selected number of layers 82A of build material is formed into 3D object 80 as shown in at least FIG. 1.

After the selectable number of layers 82A is formed, and the fluid dispenser 58 dispenses one of the fluid agents 62, which is an at least potentially electrically conductive material, at least some selected locations (e.g. 70A, 70B) on the external surface 88 of the 3D object 80. In some examples, the at least potentially electrically conductive material at these at least some selected locations act as a primer and/or a target to selectively increase electrical conductivity on the external surface of the 3D object.

In some examples, the at least some selectable locations (e.g. 70A, 70B) are defined solely via the uppermost layer of the 3D object, i.e. a top surface of the 3D object such as portion 90 in FIG. 1.

However, in some examples, the at least some selectable locations 70A, 70B are defined as an exposed portion of at least some layers (e.g. 82B) which define the sides 84, bottom 86B, etc. of the 3D object 80. Portion 92 of 3D object 80 provides one example. To implement this arrangement, as the pertinent layers (e.g. 82B) are coated and fused (before a next layer is coated), at least some of the outside voxels of those respective layers 82B may form the external surface 88 of the 3D object. These outside voxels may be infused via the first at least potentially electrically conductive material so that they will be exposed in the environment of the treatment portion to enable the substantial increase in conductivity at those exposed at least some selected locations (e.g. 70A, 70B). For instance, as shown in FIG. 1, at least some of the outside voxels of each layer 82B which form portion 92 will be infused with the first at least potentially electrically conductive material, as represented by cross-hatching 85.

In some examples, the at least some selectable locations are defined at any one of a top 86A, bottom 86B, sides 84 of the 3D object 80. In some examples, the at least some selectable locations (e.g. 70A, 70B) at which electrical conductivity is increased may be contiguous over a transition between adjacent sides 84, from a bottom 86B to a side 84, etc. or any other change in orientation, angle, etc. which may present a discontinuity or change in surface topology.

In some examples, the first at least potentially electrically conductive material comprises a metal material. In some examples, the metal material comprises silver nanoparticles. In some examples, the silver nanoparticles are already electrically conductive when dispensed via dispenser 58. However, in some examples, the silver nanoparticles are not electrically active when dispensed via dispenser 58 but may become electrically active when dispensed via dispenser 58 along with a salt solution, such as sodium chloride or other salts solutions.

In some examples, the metal material comprises a metal salt material, as further described later.

In some examples, the first at least potentially electrically conductive material comprises a non-metal material. In some examples, such non-metal materials may comprise an electrically conductive polymer material, a carbonaceous conductive material, or a semiconductive material, such as indium tin oxide (ITO) nanoparticles.

FIG. 2B is a block diagram schematically representing an example 3D object 180 including an example internal electrically conductive structure 184. In some examples, the 3D object 180 comprises the portions 90, 92 including a first at least potentially electrically conductive material, as previously described in association with the 3D object 80 of FIG. 1. However, the 3D object 180 additionally comprises an electrically conductive structure(s) 184 located (e.g. arranged) within an interior 182 of the 3D object 180. In some examples, the electrically conductive structure 184 may be additively manufactured and may comprise circuitry in some instances.

The conductive structure 184 is electrically connected internally to portion 90 via conductive element 185 and electrically connected internally to portion 92 via conductive element 186. As further described later, at least some examples of the present disclosure may enhance operation of the internal electrically conductive structure 184 by increasing conductivity at the at least some selected locations (e.g. 70A, 70B, portions 90, 92) of an external surface 88 of the 3D object 80 at which a bonding pad and/or other conductive structure may be located.

In some examples, internal conductive structure 184 (FIG. 2B) is omitted from 3D object 80 and the respective conductive elements 185, 186 are electrically connected to each other.

As previously noted, after formation of the 3D object 80 via the manufacturing portion 30, the treatment portion 110 is employed to substantially increase the electrical conductivity of the at least some selected locations. Several examples of the treatment portion 110 are described below in association with at least FIGS. 3-6. In some examples, each of the various treatment portions described in association with at least FIGS. 3-6 comprise at least some of substantially the same features and attributes as previously described for treatment portion 110 in association with FIG. 1, 2A-2B.

Figure 3:
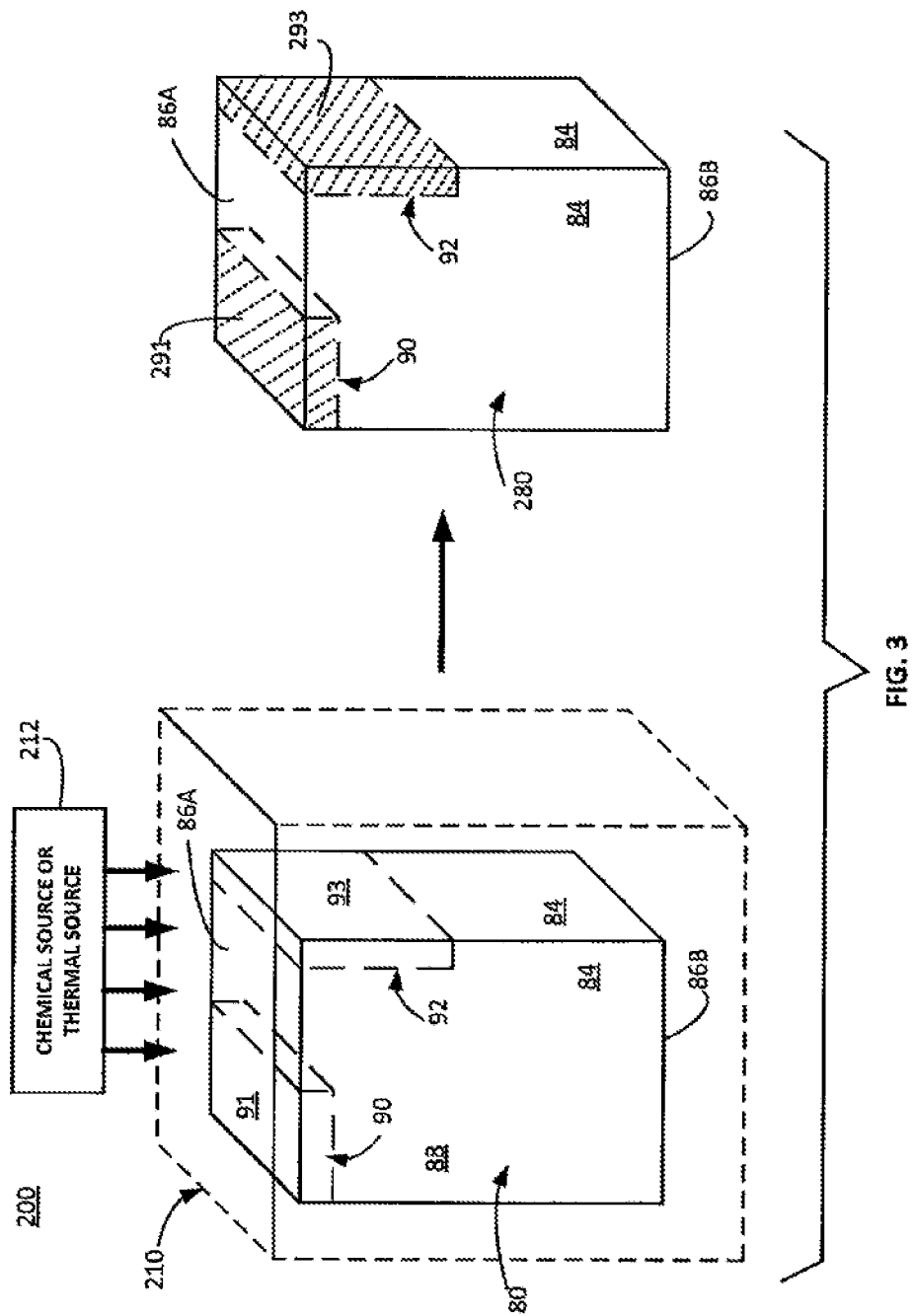
FIG. 3 is a diagram schematically representing an example treatment portion including an example chemical treatment or an example thermal treatment.

FIG. 3 is a diagram schematically representing an example treatment portion 200 including an example chemical treatment or an example thermal treatment 212 via a respective chemical or thermal source.

In some examples, during formation of the 3D object as described in association with at least FIGS. 1, 2A, the dispenser 58 dispenses a first at least potentially electrically conductive material (of the fluid agent(s) 62) onto at least some selectable locations (e.g. 70A, 70B) as a metal salt material. In some examples, the metal salt material comprises a copper salt material. In some examples, the copper salt material comprises a copper formats material.

In some examples, via the first environment 210, the external surface 88 of the 3D object 80 is subjected to a first treatment to decompose the metal salt material to an electrically conductive zero-valent metal.

In some examples, the first environment 210 is separate from, and independent of the manufacturing portion 30. For instance, the 3D object is moved from the build pad 42 to another portion of device 20 at which the treatment portion 210 is located.

In some examples, the treatment environment 210 provides a thermal treatment 212. For instance, the thermal treatment may comprise producing a first elevated temperature (e.g. about 220 degrees Celsius) at the external surface 88 of the 3D object 80, which in turn induces decomposition of the copper salt material into an electrically conductive zero-valent metallic copper, as represented via dashed cross-hatching on surfaces 291, 293.

In some examples, in addition to the subjecting the 3D object to a thermal treatment 212, the first environment 210 provides a chemical treatment 212 to which the 3D object 80 is submitted. For instance, the first environment 210 may comprise exposing (e.g. submerging, spraying, etc.) the exposed copper salt material to an amine solution, which produces copper organic complexes (i.e. a metal organic salt). Upon application of the thermal treatment to exposed the copper organic complexes to a second, lower elevated temperature (e.g. 140 degrees Celsius), the metal salt material (in the form of copper organic complexes) at the at least some selected locations is decomposed into an electrically conductive zero-valent metallic copper, as represented via the appearance of dashed cross-hatching on surfaces 291, 293.

In some examples, this copper is compatible with the build material forming layers 82A, 82B, such as a polymer material. In some examples, via this arrangement the electrical conductivity of the zero-valent metal copper at the locations (including surfaces 291, 293) is within one order of magnitude of an electrical conductivity of bulk copper. In some examples, the electrical conductivity of the zero-valent metal copper is about $\frac{1}{30}^{th}$ of bulk copper. In some examples, the electrical conductivity of the zero-valent metal copper is at least one or two orders of magnitude greater than the electrical conductivity of portions 90, 92 of 3D object 80 prior to treatment per treatment portion 200.

In some examples, a thermal treatment can be applied without exposing the 3D object to a chemical treatment. For instance, the fluid agent 82 dispensed via the dispenser 58 (onto the at least some selected locations) comprises the first at least potentially electrically conductive material as a metal salt material along with a polyvinyl alcohol (PVAOH). After completing formation of the 3D object, upon submitting the 3D object into the first environment 210, a thermal treatment is applied to heat the 3D object 80 while exposing the 3D object 80 to nitrogen gas, thereby causing the metal salt material at the at least some selected locations to decompose to result in a zero-valent metallic copper at the at least some selected locations, as represented via dashed cross-hatching on surfaces 291, 293.

In some examples, the first environment 210 may provide a chemical treatment without a thermal treatment.

In some examples, the first environment 210 is not separate from, and independent of, the manufacturing portion 30. Rather the first environment is incorporated at least partially within the manufacturing portion 30. For instance, in some examples, the 3D object 80 can remain on the build pad 42 and a thermal treatment may be applied via an energy source (e.g. 150 in FIG. 2). In some examples, the energy source used to apply the thermal treatment for increasing electrical conductivity may be the same energy source 150 used to fuse portions of various layers of the build material, such as a flash-lamp to apply flash-lamp pulse(s). However, in some examples, the energy source used to apply the thermal treatment for increasing electrical conductivity may be different from the energy source 150 used to fuse portions of various layers of the build material.

Figure 4:
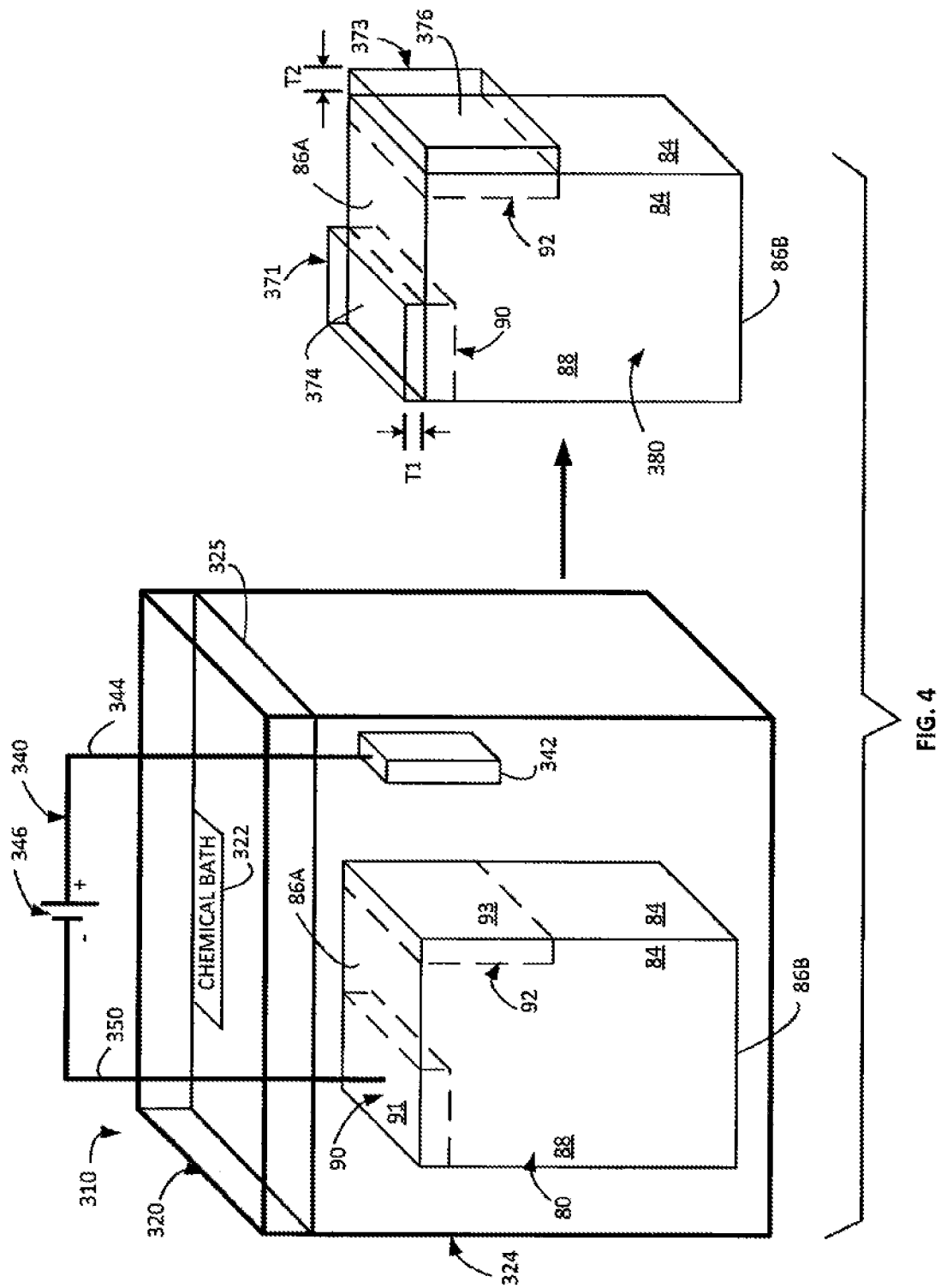
FIG. 4 is a diagram schematically representing an example treatment portion including an example electropating treatment.

FIG. 4 is a diagram 300 schematically representing an example treatment portion 310 including an example electroplating treatment implemented via environment 320. As shown in FIG. 4, via environment 320 a formed 3D object 80 is at least partially submerged below a top surface 325 of a chemical bath 322 in a container 324. In some examples, the chemical bath 322 comprises a copper salt bath. In some examples, the copper salt bath comprises a salt bath concentrated with Cu (II) $SO_4*5H_2O$.

The environment 320 also comprises a battery 346 having a positive pole (+) connected via a conductive element 344 to a metal element 342, such as bulk piece of copper. In one aspect, the metal element 342 is considered an anode. The battery 348 also has a negative pole (−) connected via conductive element 350 to a surface 91 of at least one portion 90 exposed at the external surface 88 of the 3D object 80, with portion 90 acting as a cathode. Via this arrangement, the conductive element 350 is electrically connected to the first at least potentially electrically conductive material in the portion 90 and the conductive element 344 is electrically connected to the first at least potentially electrically conductive material in the portion 92.

Via this environment 320, an electrochemical cell is formed such that upon applying a Voltage (e.g. 4V) for a period of time (e.g. 2 minutes), copper is plated onto surface 91 of the 3D object 80 to yield portion 371 of 3D object 380 in FIG. 4. In some examples, the electroplating is performed at room temperature and/or under stirring.

In order to plate surface 93 of portion 92, the conductive element 350 is moved to be in contact with surface 93 instead of surface 91 of portion 90. Upon applying the Voltage for a period of time, copper is plated onto surface 93 to yield portion 373 of 3D object 380 in FIG. 4.

Accordingly, the different portions 371, 373 of 3D object 380 are formed during different steps or different treatments.

However, in some examples, portions 90 and 92 may be electrically connected to each other via an internal electrical connection extending within an interior of the body of the 3D object, such as 3D object 180 shown in FIG. 2B. In some such examples, both portion 90 and 92 may be electroplated simultaneously even though the conductive element 350 of the electrochemical cell is electrically connected with just one of the two electrically conductive portions 90, 92.

As shown in FIG. 4, portion 371 has a thickness T1 and portion 373 has a thickness T2, which may or may not be the same as thickness T1. In some examples, the thicknesses T1, T3 are on the order of 50 nanometers to 1 millimeter. In some examples, the thicknesses T1, 53 are on the order of 200 nanometers to 100 microns. In some examples, the thicknesses T1, T2 may be understood as being somewhat exaggerated in FIG. 4 for illustrative purposes. In some examples, the thickness T1 or T2 is at least one order of magnitude less than a height of a voxel defining a thickness of the layers 82A, 82B. In some examples, the thickness T1, T2 are on the same order of magnitude as the thickness or height of a voxel defining a thickness of the layers 82A, 82B.

In some examples, the first at least potentially electrically conductive material at least partially defining the surface 91 of portion 90 and surface 93 of portion 92 comprises an electrically inactive material. In other words, at the time of being dispensed via dispenser 58, the first at least potentially electrically conductive material was in an electrically inactive state. Accordingly, in some examples, prior to submitting the 3D object 80 to a treatment portion (e.g. 300 in FIG. 4), an energy source (e.g. 150 in FIG. 2A) applies heat to portions 90, 92 to cause annealing of the surfaces 91, 93 of respective portions 90, 92, thereby transforming the first at least potentially electrically conductive material in portions 90, 92 from an electrically inactive state to an electrically active state.

In some examples, this annealing is performed while the 3D object remains on the build pad 42. However, in some examples, the 3D object 80 is first removed from build pad 42, and the annealing is implemented via an energy source accessible apart from build pad 42.

In some examples, the electrically conductive element 342 may comprise a non-metal material, which can be electroplated onto surfaces 91, 93. Such non-metal materials may comprise oxide materials, semiconductive materials, and/or conductive polymers.

In some examples, the environment 320 of the treatment portion 310 also may enhance a smoothness, appearance, etc. of the surfaces 374, 376 of electroplated portions 371, 373. For instance, the chemical bath 322 may further comprise levelers, brighteners, carriers, and/or other additive materials or fluids to enhance the electroplating process to affect the smoothness, appearance, etc. of the respective surfaces 374, 376.

In some examples, the chemical bath 322 is maintained at selectable pH, selectable temperature range, concentration, electrical current, etc. In some examples, the chemical bath 322 may comprise a surface passivator, which may minimize oxidization of the electroplated finish at surfaces 374, 376.

Figure 5:
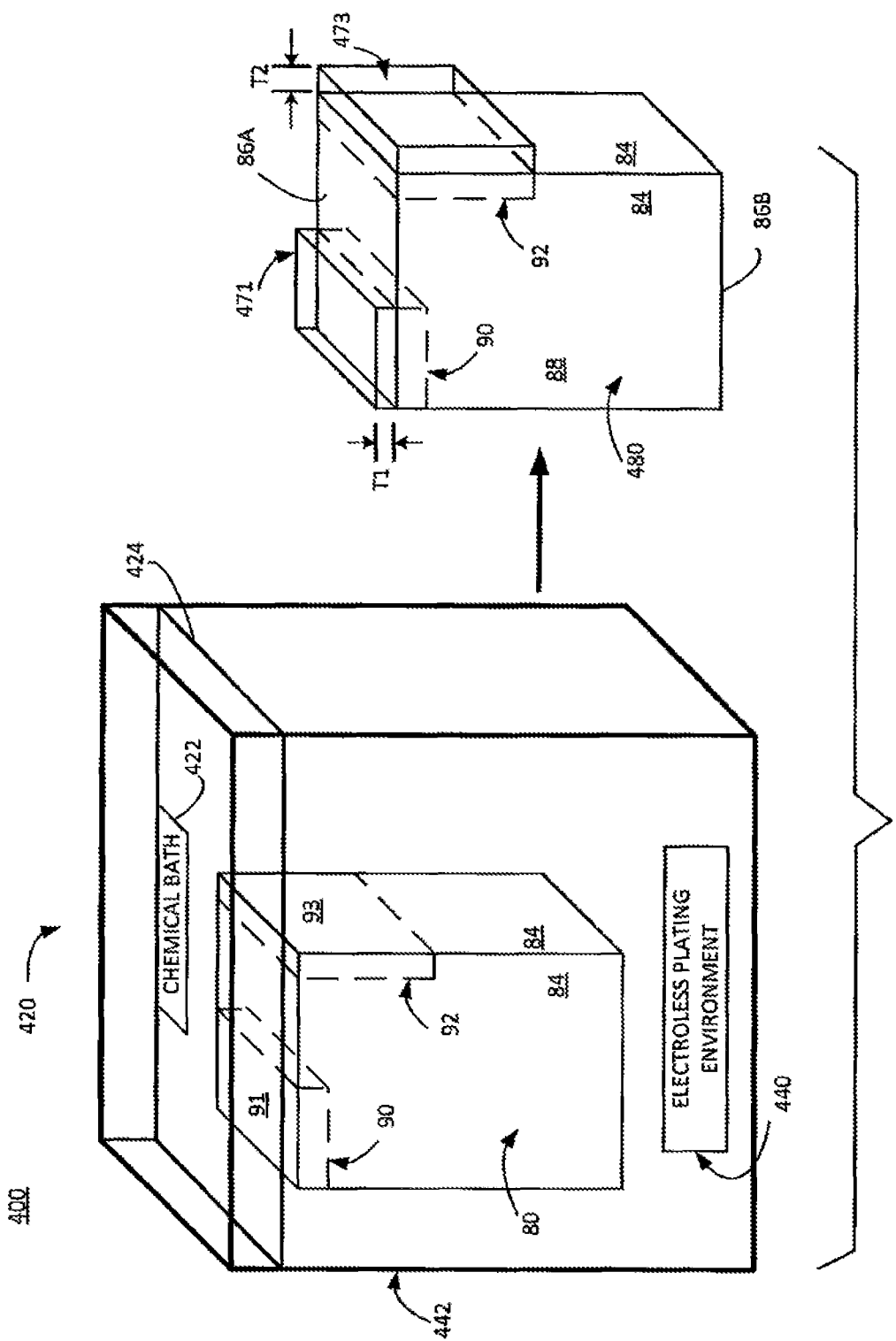
FIG. 5 is a diagram schematically representing an example treatment portion including an example electroless plating treatment.

FIG. 5 is a diagram 400 schematically representing an example treatment portion 420 including an example electroless plating environment 440. As shown in FIG. 5, a formed 3D object 80 is at least partially submerged in a chemical bath 422 in container 442 of the environment 440. The chemical bath 422 comprises at least some of substantially the same features and attributes as chemical bath 322 (FIG. 4), except that chemical bath 422 can cause electroplating on surfaces 91, 93 without the presence of a voltage source, such as battery 346 (FIG. 4). In one aspect, the constituents of the chemical bath 422 cause decomposition of metal salts within the bath 422, thereby causing a portion of those metal salts to become plated onto the surfaces 91, 93 of portions 90, 92 to yield portions 471, 473 of electroless-plated 3D object 480 in FIG. 5.

It will be understood that the electroless treatment via the electroless plating environment 440 may be performed via a chemical bath including non-metal materials for plating onto the surfaces 91, 93 of the 3D object 80.

Figure 6:
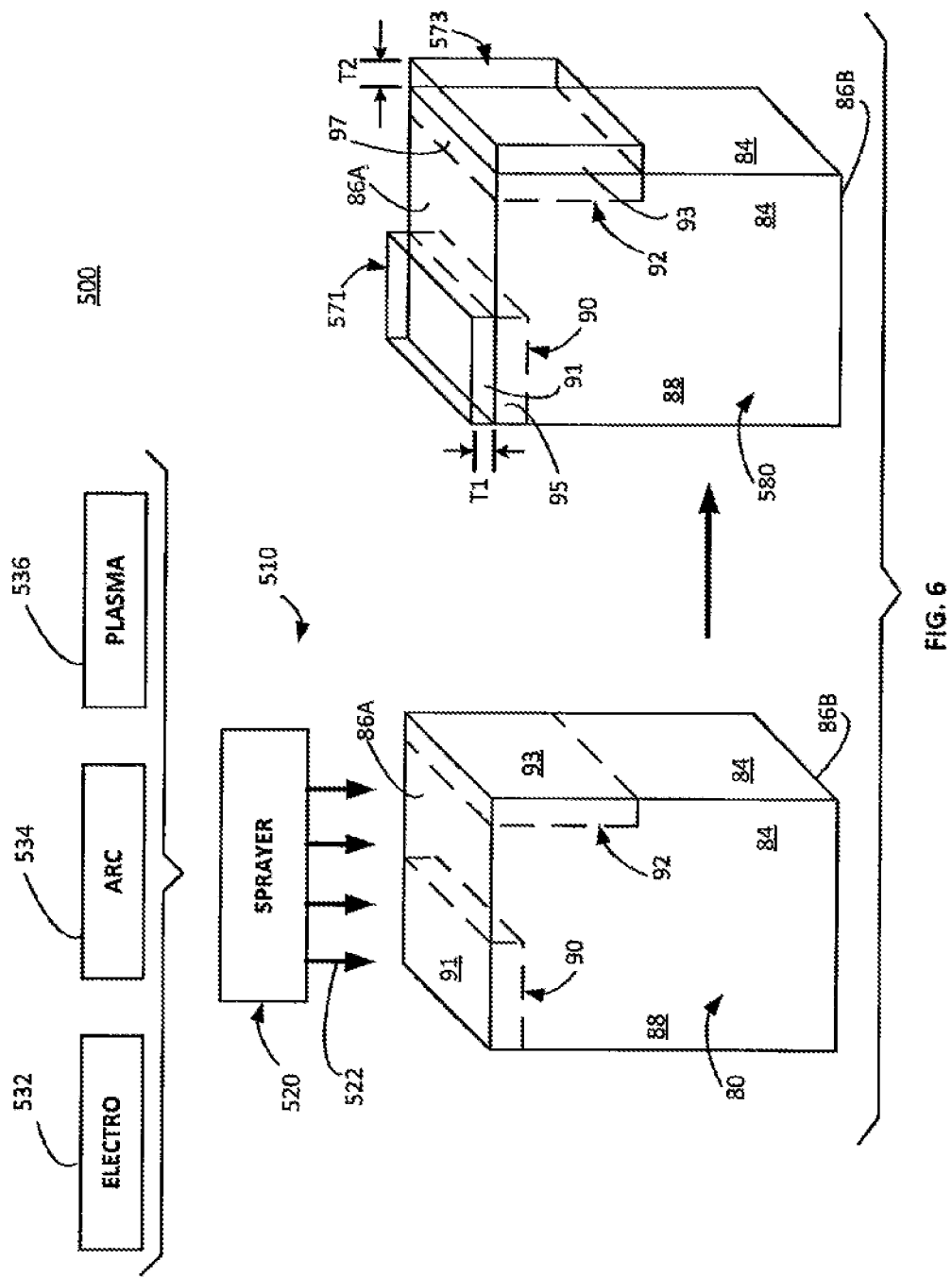
FIG. 6 is a diagram schematically representing an example treatment portion including an example spraying treatment.

FIG. 6 is a diagram 500 schematically representing an example treatment portion 510 including an example spraying treatment. After formation of the 3D object 80 via manufacturing portion 30 (FIG. 1, 2A), the 3D object 80 is submitted to treatment portion 510, as shown in FIG. 6. In some examples, treatment portion 510 comprises a sprayer 520 to spray the at least some selected locations (e.g. surfaces 91, 93 of portions 90, 92) with a fluid or powder 522 including a second electrically conductive material to plate the targeted at least some selected locations (which comprise the first at least potentially electrically conductive material) to yield portions 571, 573 of plated 3D object 580. Accordingly, the sprayer 520 enables precise and accurate deposition of the second electrically conductive material solely at the at least some selected locations.

Via this arrangement, the treatment portion 510 may omit a chemical bath or other liquid environment as was described for the respective treatment portions in association with at least FIGS. 3-5.

In some examples, the sprayer 520 is operated in a manner to avoid plating the peripheral edge portion 95, 97 of the respective portions 90, 92, as shown in FIG. 6. However, while not shown in FIG. 6, in some examples the sprayer 520 may be operated to cause plating at the peripheral edge portion 95, 97 of the respective portions 90, 92 in a manner similar shown for portions 571, 573.

In some examples, an electrical connection is established between the sprayer 520 and the targeted at least some selected locations, thereby enabling selectivity in operation of sprayer 520 to target the respective at least some selected locations.

In some examples, sprayer 520 comprises an electrosprayer 532. In some examples, sprayer 520 comprises an arc sprayer 534. In some examples, sprayer 520 comprises a plasma sprayer 536.

In some examples, the sprayer 520 may comprise a fluid dispenser, such as fluid dispenser 58, and therefore. In such examples the spraying may be performed while the 3D object remains on the build pad 42 (FIG. 1).

FIG. 7A is a block diagram schematically representing a control portion 600, according to one example of the present disclosure. In some examples, control portion 600 provides one example implementation of a control portion forming a part of, implementing, and/or managing any one of the devices, manufacturing portions, material coaters, fluid dispensers, energy sources, treatment portions, instructions, engines, functions, parameters, and/or methods, as described throughout examples of the present disclosure in association with FIGS. 1-6 and 8-9.

In some examples, control portion 600 includes a controller 602 and a memory 610. In general terms, controller 602 of control portion 600 comprises at least one processor 604 and associated memories. The controller 602 is electrically couplable to, and in communication with, memory 610 to generate control signals to direct operation of at least some the devices, manufacturing portions, material coaters, fluid supply, fluid dispensers, energy sources, treatment portions, instructions, engines, functions, parameters, and/or methods, as described throughout examples of the present disclosure. In some examples, these generated control signals include, but are not limited to, employing instructions 611 stored in memory 610 to at least direct and manage additive manufacturing of 3D objects in the manner described in at least some examples of the present disclosure.

In response to or based upon commands received via a user interface (e.g. user interface 620 in FIG. 7B) and/or via machine readable instructions, controller 602 generates control signals to implement additive manufacturing of a 3D object in accordance with at least some of the examples of the present disclosure. In some examples, controller 602 is embodied in a general purpose computing device while in some examples, controller 602 is incorporated into or associated with at least some of the devices, manufacturing portions, material coaters, fluid supply, fluid dispensers, energy sources, treatment portions, instructions, engines, functions, parameters, and/or methods etc. as described throughout examples of the present disclosure.

For purposes of this application, in reference to the controller 602, the term "processor" shall mean a presently developed or future developed processor (or processing resources) that executes sequences of machine readable instructions contained in a memory. In some examples, execution of the sequences of machine readable instructions, such as those provided via memory 610 of control portion 600 cause the processor to perform actions, such as operating controller 602 to implement additive manufacturing of 3D objects as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 610. In some examples, memory 610 comprises a computer readable tangible medium providing non-volatile storage of the machine readable instructions executable by a process of controller 602. In other examples, hard wired circuitry may be used in place of or in combination with machine readable instructions to implement the functions described. For example, controller 602 may be embodied as part of at least one application-specific integrated circuit (ASIC). In at least some examples, the controller 602 is not limited to any specific combination of hardware circuitry and machine readable instructions, nor limited to any particular sore for the machine readable instructions executed by the controller 602.

In some examples, control portion 600 is entirely implemented within or by a stand-alone device, which has at least some of substantially the same features and attributes as device 20 as previously described in association with at least FIGS. 1-9. In some examples, the control portion 600 is partially implemented in the device 20 and partially implemented in a computing resource separate from, and independent of, the device 20 but in communication with the device 20.

In some examples, control portion 600 includes, and/or is in communication with, a user interface 620 as shown in FIG. 7B. In some examples, user interface 620 comprises a user interface or other display that provides for the simultaneous display, activation, and/or operation of at least some of the devices, manufacturing portions, material coaters, fluid supply, fluid dispenser, energy source, treatment portions, instructions, engines, functions, parameters, and/or methods, as described in association with FIGS. 1-7A and 8-9. In some examples, at least some portions or aspects of the user interface 620 are provided via a graphical user interface (GUI), and may comprise a display 624 and input 622.

FIG. 8 is a block diagram schematically representing a manufacturing engine 700, according to one example of the present disclosure. In some examples, manufacturing engine 700 provides one example implementation of instructions 611 in control portion 600 in FIG. 7A suitable for operation of device 20. In some examples, manufacturing engine 700 comprises at least some of substantially the same features and attributes of instructions 611 and/or control portion 600 generally in association with FIG. 7A.

As shown in FIG. 8, in some examples, manufacturing engine 700 comprises a coater engine 710, a dispenser engine 720, a treatment engine 770, a composition engine 780, and/or an energy source engine 790. In some examples, the manufacturing engine 700 directs and manages additive manufacturing of a 3D object, including coating materials and/or dispensing materials and fluids to additively form a three-dimensional (3D) object.

In general terms, the coater engine 710 enables the selection of materials to be deposited, such as coating a build material onto a build pad 42 and/or previously formed layers of a partially formed 3D object. In some examples, the coater engine 710 comprises a material parameter 712. Via the material parameter 712, the manufacturing engine 700 specifies which build material(s) and the quantity of such build materials which can be used to additively form a body of the 3D object. In some examples, these materials are deposited via material coater 50 of manufacturing portion 30 (FIG. 1).

The material controlled via material parameter 512 of coater engine 510 may comprise polymers, ceramics, etc. having sufficient strength, formability, toughness, etc. for the intended use of the 3D object with at least some example materials being previously described in association with at least FIG. 1A.

In some examples, the dispenser engine 720 may specify which agents are to be selectively deposited onto a previously deposited layer of material and/or in association with other agents. In some examples, such agents are deposited via fluid dispenser 58 (FIG. 1). In some examples, the dispenser engine 720 comprises a fluid agent function 730.

In some examples, the fluid agent function 730 comprises a conductive material parameter 732 to control dispensing fluid agents including at least potentially electrically conductive materials, such as at least some selectable locations (e.g. 70A, 70B in FIG. 1). In some examples, this dispensing may sometimes be referred to as arranging the at least potentially electrically conductive materials at the at least some selectable locations.

In some examples, the conductive material parameter 732 comprise a metal material parameter 734 to specify which metal material (e.g. silver nanoparticles) will be dispensed as the first at least potentially electrically conductive material. In some examples, the metal material parameter 734 comprises a metal salt parameter 736 to specify a metal salt (e.g. copper salt) as the first at least potentially electrically conductive material.

In some examples, the conductive material parameter 732 comprises a non-metal material parameter 740 to specify a non-metal material, such as carbonaceous materials, semiconductive materials, etc. as the first at least potentially electrically conductive material.

In some examples, the fluid agent function 730 controls dispensing via dispenser 58 of a fluid agent (62 in FIG. 1) used as part of forming layers 82A, 82B (FIG. 1) of a build material in additively manufacturing a 3D object. In some examples, the fluid agent function 730 comprises a fusing parameter 750, a detailing parameter 752, and other parameter 754.

In some examples, the fusing parameter 750 controls dispensing of a fusing agent which may facilitate fusing of the coated build materials (e.g. a build material) into a monolithic structure to form 3D object 80 (FIG. 1, 2A), while the detailing parameter 752 controls dispensing of a detailing agent to complement fusing of the coated build materials. In some examples, other agents or additional agents are dispensed selectively as controlled via other parameter 754.

It will be understood that in some examples the coater engine 710 and dispenser engine 720 are not limited to specifying the types of materials, agents, etc. associated with parameters shown in FIG. 8, but instead may specify any type of material, agent, etc. conducive to additively manufacturing a 3D object, with such type of materials, agents, etc. depending on the size, type, shape, use, etc. of the 3D object, and depending on the particular type of method used to perform the additive manufacturing of the 3D object.

With respect to the various fluid agents and/or various properties controllable via dispenser engine 720, it will be understood that dispenser 58 (FIG. 1) of manufacturing portion 30 may be configured with correspondingly separate reservoirs, delivery channels, etc. (e.g. ink supply 156 in FIG. 2A) to enable such separate fluid agents and/or additives to be selectively dispensed as desired during the additive manufacturing of the 3D object. Similarly, to the extent that different build materials are used per parameter 712 of coater engine 710, then each different material may be contained in separate reservoir until deposited via coater 50 (FIG. 1).

In some examples, the treatment function 770 of dispenser engine 720 controls at least some operations of the treatment portions previously described in association with at least FIGS. 3-6. In some examples, the treatment function 770 comprises a chemical parameter 771 and/or a thermal parameter 772 to control application of a chemical treatment and a thermal treatment, respectively, to the 3D object 80 as described in association with at least FIG. 3. In some examples, the treatment function 770 comprises an electroplating parameter 773 to control electroplating the 3D object 80 as described in association with at least FIG. 4. In some examples, the treatment function 770 comprises an electroless plating parameter 774 to control electroless plating the 3D object 80 as described in association with at least FIG. 5. In some examples, the treatment function 770 comprises spray parameter 775 to control spraying the 3D object 80 as described in association with at least FIG. 6.

In general terms, the composition engine 780 of manufacturing engine 700 enables the selection of attributes by which the selected fluid agents are deposited via dispenser engine 720. In some examples, the selected fluid agents include at least potentially electrically conductive materials as described in various examples throughout the present disclosure. For instance, in some examples the composition engine 780 comprises a location parameter 781, a size parameter 782, a shape parameter 783, a quantity parameter 785, and/or a spacing parameter 786. The location parameter 781 can specify a location at which the various agents and/or structural features of the 3D object 80 are located. For instance, the location parameter 781 may specify a location at which the first at least potentially electrically conductive material is dispensed. The location parameter 781 also may specify a location at which a fluid agent is to deposited to cause fusing (e.g. via melting, via sintering, etc.) of a layer of material. Meanwhile, the size parameter 782 can specify a size of the area over which the particular fluid agent (e.g. electrically conductive, fusing, color, etc.) is deposited. The size can be specified as an absolute quantity or as a relative quantity, i.e. a size relative to a size or volume of the surrounding material not receiving a particular fluid agent.

In some examples, the shape parameter 783 enables specifying a shape over which a particular fluid agent is deposited, which can be absolute or relative to the general shape of the 3D object 80. In some examples, the quantity parameter 785 enables specifying a quantity of locations at which a particular agent is deposited on a layer of material. In some examples, the spacing parameter 786 enables specifying a spacing between multiple locations at which a particular fluid agent is deposited.

In general terms, the energy engine 790 of manufacturing engine 700 may specify various processing steps on the deposited materials and agents, such as applying energy to cause fusing, etc. of the deposited materials. In some examples, the energy engine 790 may control application of energy to anneal a first at least potentially electrically conductive material for conversion from an electrically inactive state to an electrically active state prior to submission to a treatment portion 110 (FIG. 1). In some examples, the energy engine 790 may control application of energy to apply a thermal treatment as part of one of the treatment portions described in association with FIGS. 3-6.

In some examples, the energy engine 790 may control an amount of time that energy from energy source (e.g. 150 in FIG. 2A) is emitted (i.e. irradiation) toward the material, agents, etc. on the build pad 42. In some examples, the energy source 152 may irradiate the material layer in a single flash or in multiple flashes. In some examples, the energy source 152 may remain stationary (i.e. static) or may be mobile. In either case, during such irradiation, the energy engine 790 controls the intensity, volume, and/or rate of irradiation.

Figure 9:
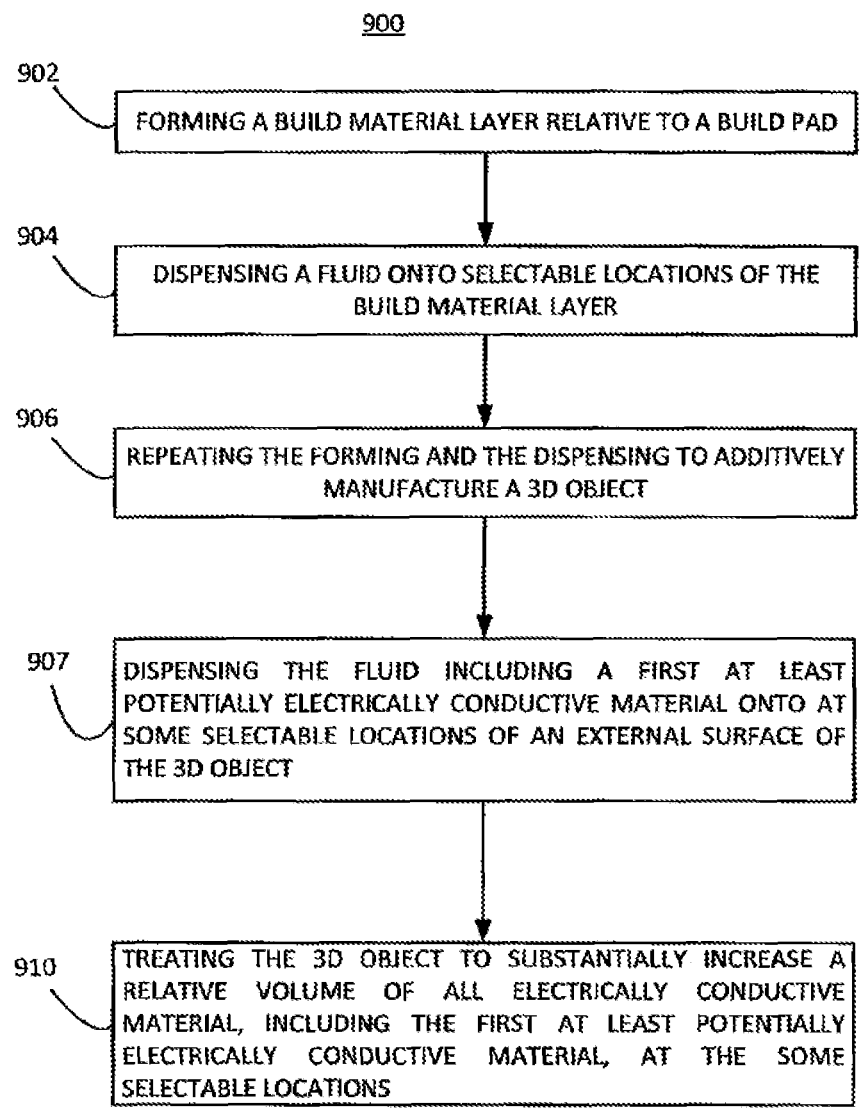
FIG. 9 is a flow diagram schematically representing an example method of additive manufacturing.

FIG. 9 is a flow diagram 900 schematically representing a method of manufacturing a 3D object, according to one example of the present disclosure. In some examples, method 900 is performed via at least some of the devices, manufacturing portions, material coaters, fluid dispensers, energy sources, treatment portions, instructions, engines, function, methods, etc. as previously described in association with at least FIGS. 1-8. In some examples, method 900 is performed via at least some of the devices, manufacturing portions, material coaters, fluid dispensers, energy sources, treatment portions, instructions, engines, function, methods, etc. other than those previously described in association with at least FIGS. 1-8. In some examples, method 900 is implemented via at least a manufacturing engine, such as manufacturing engine 700 in FIG. 9 and/or instructions 611 in FIG. 7A.

As shown in FIG. 9, at 902 method 900 comprises forming a build material layer relative to a build pad. At 904, method 900 comprises dispensing a fluid onto selectable portions of the build material layer. At 906, method 900 comprises repeating the forming and the dispensing to additively manufacture a 3D object. At 907, method 900 comprises dispensing a first at least potentially electrically conductive fluid in at least some selectable locations of an external surface of the 3D object. At 910, method 900 comprises treating the 3D object to substantially increase a relative volume of all electrically conductive material, including the first at least potentially electrically conductive material, at the some selectable locations.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An additive manufacturing device comprising:
a coater;
a dispenser;
a treatment portion; and
a controller configured to cause:
the coater to coat, layer-by-layer, a build material on a build pad to form a 3D object;
the dispenser to dispense at least a fluid including a first at least potentially electrically conductive material along with a salt solution causing the potentially electrically conductive material to become electrically active in at least some selected locations of an external surface of the 3D object; and
the treatment portion to treat the 3D object to substantially increase electrical conductivity on the external surface of the 3D object at the at least some selected locations dispensed with the fluid by causing plating to be deposited on the 3D object at the at least some selected locations.

2. The device of claim 1, further comprising:
an energy source configured to apply energy to fuse selected portions of each respective layer of the 3D object.

3. The device of claim 1,
wherein the dispenser is further configured to dispense a fluid including a second electrically conductive material in the form of a metal salt in at least some selected locations of the external surface of the 3D object,
wherein the treatment portion is configured to expose the 3D object to a first treatment to decompose the metal salt to a zero-valent metal, and
wherein the first treatment comprises at least one of a chemical treatment or a thermal treatment.

4. The device of claim 3, wherein the electrical conductivity at the at least some selected locations dispensed with the second electrically conductive material, after the first treatment, is on a same order of magnitude of a bulk conductivity of the metal forming the metal salt.

5. The device of claim 1, wherein the plating is electroplating formed as a second electrically conductive material deposited onto the first electrically conductive material at the at least some selected locations to substantially increase electrical conductivity.

6. The device of claim 1, wherein the dispenser is further configured to dispense a fluid including a second electrically conductive material in the form of a metal salt in at least some selected locations of an external surface of the 3D object,
wherein at a time of the dispensing of the second electrically conductive material, the second electrically conductive material is in an electrically inactive state, and
wherein the device is configured to apply energy to the at least some selected locations dispensed with the second electrically conductive material to convert the second electrically conductive material from the electrically inactive state to an electrically active state.

7. The device of claim 1, wherein the treatment portion is configured to treat a first group of the at least some selected locations with a second electrically conductive material and to treat a second group of the at least some selected locations with a third electrically conductive material having a material composition different than the second electrically conductive material.

8. The device of claim 1, wherein the treatment portion comprises at least one of:

a sprayer to deposit the plating as a second electrically conductive material at the at least some selected locations via at least one of electrospraying, arc spraying, and plasma spraying; or an electroless plating treatment to deposit the plating as a second electrically conductive material at the at least some selected locations.

9. A device comprising:
a control portion including a processing resource configured to execute machine-readable instructions, stored in a non-transitory medium, to:
arrange, within a build environment, layers of a build material on a build pad to additively manufacture a monolithic 3D object;
dispense in at least some selected locations of an external surface of the 3D object a fluid including a first potentially electrically conductive material along with a salt solution causing the potentially electrically conductive material to become electrically active; and
treat, within a treatment environment, the 3D object to substantially increase an electrical conductivity at the at least some selected locations dispensed with the fluid by causing plating to be deposited on the 3D object at the at least some selected locations.

10. The device of claim 9, the instructions being further executable to implement a treatment engine to select a treatment to increase the electrical conductivity at the at least some selected locations via at least one of:
an electroplating treatment;
an electroless plating treatment;
or
a spraying treatment.

11. The device of claim 9, the instructions being further executable to implement a dispenser engine to select the first electrical conductive material from a fluid comprising at least one of:

a metal material; or
a non-metal material.

12. An additive manufacturing method comprising:
forming a build material layer on a build pad;
dispensing a first fluid onto selected portions of the build material layer;
repeating the forming and the dispensing of the first fluid to additively manufacture a 3D object;
dispensing a second fluid comprising a first potentially electrically conductive material and a salt solution causing the potentially electrically conductive material to become electrically active, at at least some selected locations of an external surface of the 3D object;
treating the external surface of the 3D object to substantially increase a volume of electrically conductive material, including the first potentially electrically conductive material, at the at least some selected locations; and
electroplating a second electrically conductive material at the at least some selected locations dispensed with the second fluid.

13. The method of claim 12, further comprising dispensing a third fluid comprising a metal salt in at least some selected locations of the external surface of the 3D object, wherein the treating further comprises:
exposing the external surface of the 3D object to a first treatment to decompose the metal salt to a zero-valent metal exposed on the external surface of the 3D object.

14. The method of claim 12, wherein the respective first and second electrically conductive materials define all electrically conductive materials at the at least some selected locations.

15. The method of claim 12, further comprising:
arranging an electrically conductive structure within an interior of the 3D object, with at least one portion of the electrically conductive structure electrically connected to at least one of the some selected locations.

* * * * *